(12) United States Patent
Ebrom et al.

(10) Patent No.: US 10,147,571 B2
(45) Date of Patent: *Dec. 4, 2018

(54) KNOB ASSEMBLIES WITH ENCODER CONTROLLED ILLUMINATION

(71) Applicant: WHIRLPOOL CORPORATION, Benton Harbor, MI (US)

(72) Inventors: Matthew P. Ebrom, Holland, MI (US); Neomar Giacomini, Benton Harbor, MI (US); Eric J. Schuh, Stevensville, MI (US); Miguel F. Thimann, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,042

(22) Filed: Feb. 22, 2017

(65) Prior Publication Data
US 2017/0162346 A1 Jun. 8, 2017

Related U.S. Application Data

(63) Continuation of application No. 14/575,438, filed on Dec. 18, 2014, now Pat. No. 9,607,792.

(51) Int. Cl.
| H01H 9/18 | (2006.01) |
| G05G 1/10 | (2006.01) |
| H01H 19/02 | (2006.01) |
| F21V 23/00 | (2015.01) |
| F21V 8/00 | (2006.01) |
| H01H 19/60 | (2006.01) |
| F21Y 113/10 | (2016.01) |
| F21Y 115/10 | (2016.01) |
| H05B 33/08 | (2006.01) |

(52) U.S. Cl.
CPC ......... *H01H 19/025* (2013.01); *F21V 23/003* (2013.01); *G02B 6/0001* (2013.01); *F21Y 2113/10* (2016.08); *F21Y 2115/10* (2016.08); *H01H 19/60* (2013.01); *H05B 33/0854* (2013.01)

(58) Field of Classification Search
CPC .. H01H 9/161; H01H 9/182; H01H 2009/183; G05G 1/105
See application file for complete search history.

(56) References Cited

U.S. PATENT DOCUMENTS

| 1,566,069 A | 12/1925 | Buchholz et al. |
| 2,701,286 A | 2/1955 | Slate et al. |
| 2,750,918 A | 6/1956 | Willman |
| 2,999,148 A | 9/1961 | Kay |

(Continued)

FOREIGN PATENT DOCUMENTS

| DE | 102009003253 A1 | 11/2010 |
| DE | 10342334 B4 | 1/2013 |

*Primary Examiner* — Ismael Negron

(57) ABSTRACT

A knob assembly includes a repositionable knob having an outer surface and an inner surface defining an interior, light-transmissive indicia provided on the knob and viewable from the outer surface, at least one light source located relative to the repositionable knob and emitting light into the interior of the knob to backlight the light-transmissive indicia, a position sensor providing a position output indicative of the position of the repositionable knob, and a controller configured to receive the position output and control the at least one light source to maintain a predetermined backlighting of the indicia.

20 Claims, 3 Drawing Sheets

(56) References Cited

U.S. PATENT DOCUMENTS

| | | |
|---|---|---|
| 3,619,594 A | 11/1971 | Morez |
| 5,464,955 A | 11/1995 | Cole |
| 5,861,589 A | 1/1999 | Sato et al. |
| 5,993,019 A | 11/1999 | Kline et al. |
| 6,590,174 B2 | 7/2003 | Zysnarski et al. |
| 6,667,446 B1 | 12/2003 | Schuberth et al. |
| 6,876,313 B2 | 4/2005 | Hsiung et al. |
| 7,059,735 B2 | 6/2006 | Orikasa |
| 7,060,916 B1 | 6/2006 | Amit et al. |
| 7,163,455 B2 | 1/2007 | Ogawa et al. |
| 7,253,369 B2 | 8/2007 | Fu et al. |
| 8,469,529 B2 | 6/2013 | Hirota |
| 8,801,206 B2 | 8/2014 | Chen et al. |
| 8,813,676 B2 | 8/2014 | Fuller et al. |
| 8,979,289 B2 | 3/2015 | Camli et al. |
| 9,146,033 B2 | 9/2015 | Cadima et al. |
| 2012/0287663 A1 | 11/2012 | Lathrop et al. |

KNOB ASSEMBLIES WITH ENCODER CONTROLLED ILLUMINATION

CROSS-REFERENCE TO RELATED APPLICATIONS

This application is a continuation of U.S. application Ser. No. 14/575,438, filed Dec. 18, 2014, now U.S. Pat. No. 9,607,792, which is incorporated herein by reference in its entirety.

BACKGROUND

Household appliances, examples of which may include a clothes washer, clothes dryer, an oven, a cooktop, a refrigerator, or a dishwasher, etc., perform useful cycles of operation and often have electrical and mechanical components responsible for implementing the cycle of operation of the appliance, with one or more of the components controlling the operation of the other components. For example, a controller, such as a microprocessor-based controller, having a printed circuit board (PCB) with memory, may be used to control the operation of the various components to implement a cycle of operation.

A Human Machine Interface (HMI) (a/k/a User Interface) may be provided as part of or separate from the controller to provide input/output communication between a user of the appliance and the controller. One or more knob assemblies are often part of the HMI to provide a way for the human to provide input to the HMI.

SUMMARY

An aspect of the present disclosure relates to a knob assembly including a repositionable knob having an outer surface and an inner surface defining an interior, a structural framework located within the interior, and a light-transmissive indicia provided on the knob and viewable from the outer surface, at least one light source located relative to the repositionable knob and emitting light to transmit light into the interior of the knob past the structural framework and backlight the light-transmissive indicia, a position sensor providing a position output indicative of the position of the repositionable knob, and a controller receiving the position output and operably coupled to the at least one light source to independently control an intensity of light transmitted by the at least one light source, the controller programmed to use the position output to control the intensity of the at least one light source to at least partially compensate for any blocked light to maintain a predetermined backlighting of the light-transmissive indicia.

A knob assembly including a repositionable knob having an outer surface and an inner surface defining an interior and a light-transmissive indicia provided on the knob and viewable from the outer surface, at least one light source located relative to the repositionable knob and emitting light to transmit light into the interior of the knob and backlight the light-transmissive indicia, a position sensor providing a position output indicative of the position of the repositionable knob, and a controller receiving the position output and operably coupled to the at least one light source to independently control an intensity of light transmitted by the at least one light source, the controller programmed to use the position output to control the intensity of the at least one light source to maintain a predetermined backlighting of the light-transmissive indicia.

A knob assembly including a repositionable knob having an outer surface and an inner surface defining an interior, a structural framework located within the interior, and a light-transmissive indicia provided on the knob and viewable from the outer surface, at least one light source located relative to the repositionable knob and emitting light into the interior of the knob past the structural framework and backlight the light-transmissive indicia, a position sensor providing a position output indicative of the position of the repositionable knob, and a controller receiving the position output and operably coupled to the at least one light source to independently control an intensity of light transmitted by the at least one light source based on the received position output to maintain a predetermined backlighting of the light-transmissive indicia.

DETAILED DESCRIPTION

Figure 1:
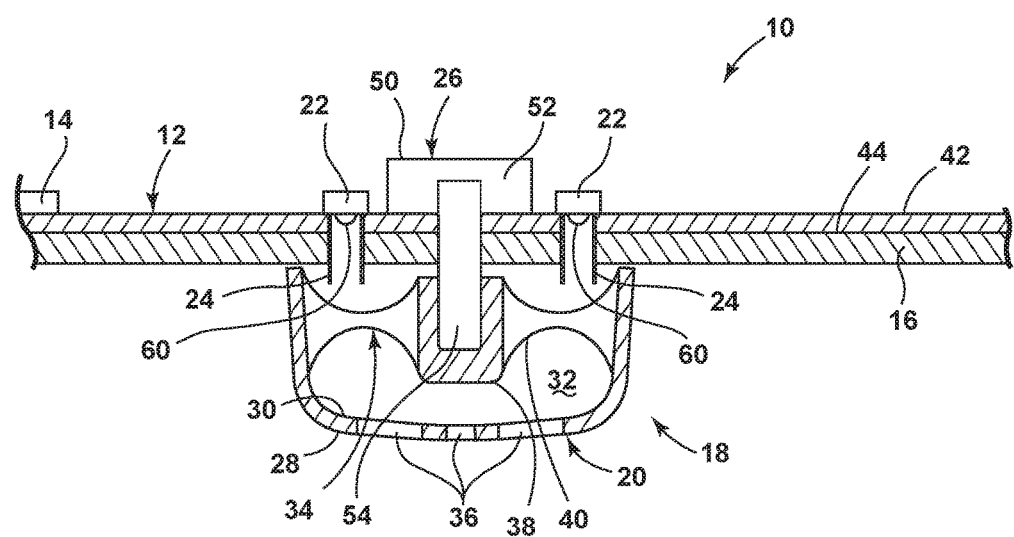
FIG. 1 is a side, cross-sectional view of a first embodiment of a knob assembly according to the invention, with the knob assembly comprising a knob and a rotary encoder.

Referring to FIG. 1, a human user interface 10 is shown and includes a controller in the form of a PCB 12 with a microprocessor 14, a fascia 16 overlying the PCB 12, and a knob assembly 18 carried by the PCB 12 and extending through the fascia 16.

The knob assembly 18 comprises a repositionable knob, illustrated as a rotatable knob 20, at least one light source illustrated as multiple light sources 22 each having a light emitter 60, with corresponding light guides 24, and a position sensor, which is illustrated as a rotary encoder 26. The rotatable knob 20 comprises an outer surface 28 and an inner surface 30 defining an interior 32. A light-transmissive indicia 36 is provided on the knob 20 and viewable from the outer surface 28. A structural framework 34 is located within the interior 32 to provide structural support to the knob 20. The structural framework 34 may be of any desired structure. However, in many implementations, it is a hub 38 and spoke 40 structure. The structural framework 34 may also vary in thickness.

The light sources 22 and rotary encoder 26 are mounted to the PCB 12, which, as illustrated, is on a rear side 42, but could just as easily be mounted to a front side 44 of the PCB 12. The light guides 24 extend through an opening in the PCB 12 and the fascia 16, and direct the light emitted by the light source 22 from the rear side 42, through the PCB 12 and fascia 16, and into the interior 32 of knob 20. In alternate embodiments, at least some of the light sources 22 may be mounted to a front side 44 of the PCB 12.

The rotary encoder 26 includes an encoder body 50, defining an interior 52, and a rotatable shaft 54, mounted to the body 50 for relative rotation. The knob 20 is mounted to the rotatable shaft 54. The shaft 54 has one end fixedly mounted to the structural framework 34 and another end rotatably mounted to the PCB 12. The knob 20 is typically mounted to the shaft 54 to prevent relative rotation between the shaft 54 and knob 20. The encoder body 50 may be mounted, such as by soldering, to the PCB 12.

The encoder body 50 may be operably coupled to the microprocessor 14 via a conductive trace on the PCB 12. The rotary encoder 26 may be configured to transform the rotational position of the shaft 54 into electrical signals, which may output to the microprocessor 14 along the trace. The electrical signals may directly indicate a selection by the user or may be used by the microprocessor 14 to determine the selection by the user.

The encoder 26 may be a hollow-shaft rotary encoder or any other suitable type of encoder. Further, the encoder 26 may be implemented as either an absolute or a relative rotary encoder. The encoder 26 may have its own circuit board and processor to determine the rotary position of the shaft 54 and/or knob 20. The circuit board of the encoder 26 may be connected to the microprocessor 14. The rotary encoder 26, PCB 12, light guide 24, and light source 22 collectively define the major element of a rotary encoder assembly.

The knob 20 and shaft 54 may have various shapes and/or designs. By way of non-limiting examples, the knob 20 and shaft 54 may be a singular piece or may alternatively be operably coupled together in a suitable manner. The knob 20 may have an axis about which it rotates and it is contemplated that regardless of the configuration of the knob 20 and shaft 54, the rotational axis of the knob 20 may be collinear with a rotational axis of the shaft 54.

The light transmissive indicia 36 may comprise an insert provided in the rotatable knob 20 and may be of different color, material, and/or transmittance than that of knob 20. The light transmissive indicia 36 may comprise multiple light transmissive indicia 36, with the predetermined backlighting highlights one or all of the multiple light transmissive indicia 36. In alternate embodiments, the knob 20 or the indicia 36 may comprise a light diffuser (not shown) to spread out or scatter the light in the interior 32 of knob 20.

The light sources 22 are located relative to the rotatable knob 20 and below at least a portion of the structural framework 34 to transmit light into the interior 32 of the knob 20 past the structural framework 34 to backlight the light-transmissive indicia 36. At least some of the light sources 22 and/or light guides 24 may be mounted directly below the interior 32 of knob 20. Light sources 22 may be light emitting diodes (LEDs) or alternative light emitting devices. The structural framework may be of a transparent or semi-transparent material to better allow light to pass through to the indicia 36.

Each light source 22 may be of a single color or multiple colors. For single color, a single color LED is contemplated. For multiple colors, a multiple color LED, like a tri-colored LED, is contemplated. The microprocessor 14 may control the mixing of light from each light source 22 to create custom color(s) dependent on the rotary position of knob 20. The microprocessor 14 may execute a suitable program that is configured to select the color based on the rotational position.

A predetermined backlighting may be applied to the light transmissive indicia 36 based on the rotational position of the knob 20. The microprocessor 14 uses the rotational position of the knob 20 to determine the intensity and/or color of each of the light sources 22 to generate the predetermined backlighting, which is accomplished by an algorithm being implemented as a computer program being executed by the microprocessor 14, with the algorithm using the rotational position of the knob 20 as input. By predetermined backlighting, it is meant that at least the intensity of the light, and optionally the color, of the light sources is controlled so that a predetermined backlight pattern is applied to the light-transmissive indicia 36. One such predetermined backlighting is one that provides the light-transmissive indicia with 36 a substantially even backlighting when viewed from the outer surface 28 of the knob 20.

While an even distribution of light may seem simple at first, when one realizes that the structural framework 34 will block one or more of the light sources 22, an even distribution becomes more complicated because the intensity must be varied to compensate for the blocked light sources 22. The problem is further exacerbated in that the effected light sources 22 and the amount of blockage is dependent on the rotational position of the knob 20. The invention solves this problem by using the rotational position of the knob to determine which light sources 22 are blocked and the degree of blockage of each of the blocked light sources 22 and thereby determine the intensity level for each of the light sources to obtain an even distribution. The microprocessor 14 then uses this information to control the intensity of the light sources 22.

One method for implementing the invention can be a data table having corresponding intensity levels for a plurality of rotational positions. In such a scenario, the microprocessor 14 receives the position output and operably coupled to the multiple lights sources 22 to independently control the intensity of light transmitted by the multiple light sources 22 according to the intensity values for the corresponding rotational position. In such a solution, it is inherent that the data table values take into account the position of the structural framework 34 relative to the corresponding rotational position. These relationships can be determined by suitable testing for a given structural framework 34 in a particular knob 20. A different data table may be provided for different knobs 20/structural framework 34.

An alternative would be to provide a map of the structural framework relative to the rotational position of the knob. The algorithm could then take into account the rotational position from the encoder 26 and the corresponding location of the structural framework 34 based on the map and use these to determine the intensity of illumination for the light sources 22 to obtain the even distribution.

The intensity of each light source 22 may be individually controlled to obtain the desired backlighting. In some cases it may be necessary to increase the intensity of one or more of the light sources 22 while decreasing the intensity of the other light sources. For example, when a light source is partially blocked by the structural framework, the intensity of that light source may be increased. If the intensity increase is not sufficient to obtain the even distribution, for example, the intensity of the light sources may be reduced to obtain an overall even distribution.

The predetermined backlighting may include other types of backlighting than an even distribution. Another example of backlighting is one that highlights the user selection while evenly backlighting the rest of the knob 20. As with the prior example, the data table would have rotational positions corresponding to the predetermined user selections and the corresponding intensity levels for each of the light sources 22. The intensity levels could be determined by testing and a data table provided for a particular knob 20/structural framework 34. Other predetermined backlighting scenarios are contemplated.

Figure 2:
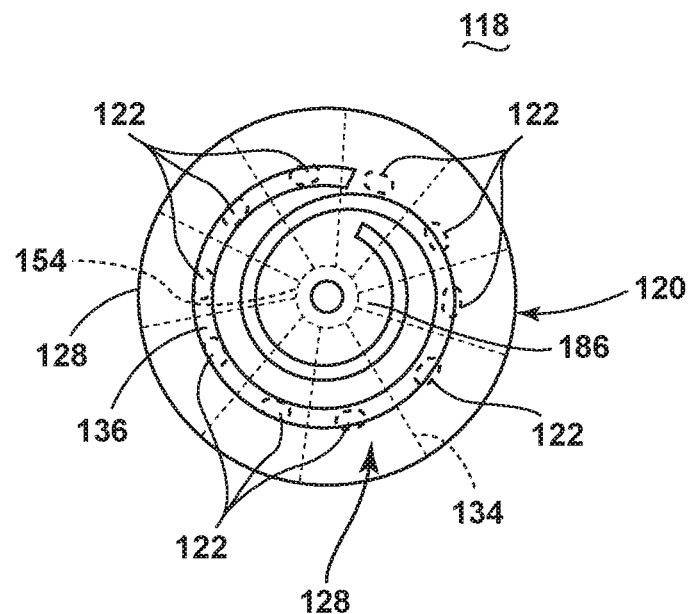
FIG. 2 is a top view of the knob of a second embodiment.

Referring now to FIG. 2, a second embodiment of a knob assembly 118 is illustrated. Like parts between the second and first embodiments will use the same numbers with a 100 prefix. The second embodiment knob assembly 118 is similar to the first embodiment, except that the hub/spoke structural framework 134 of the outer surface 128 has a more complex shape which can be thought of in terms of the transmissible nature of the materials. The structural support may be thought of as the least transmissive or even opaque areas, collectively referred to as low transmissive areas 186, whereas the indicia 136 may be thought of as the more transmissible areas. The indicia 136, illustrated as a spiral, and the multiple light sources 122 are positioned about the shaft 154 in a circular fashion, resulting in the indicia 136 being non-symmetric relative to the circularly arranged light sources 122. The indicia 136 may be unevenly illuminated due to the blockage of the light sources 122 by low transmissive areas 186, which may be opaque. As illustrated, some light sources 122 are covered more than other light sources 122 by the low transmissive area 186. Each light source 122 is controlled independently. Based on the rotational position of the knob 120, the intensity of the light from the light sources 122 will be adjusted. For example, if a single light source 122 is known to be partially or completely blocked by a low transmissive area 186, the intensity of light source 122 can be increased to better provide a more evenly illuminated indicia 136. If the increase in intensity of the blocked light source 122 is insufficient for an even distribution, then the intensity from one or more of the other light sources 122 may be reduced.

Figure 3:
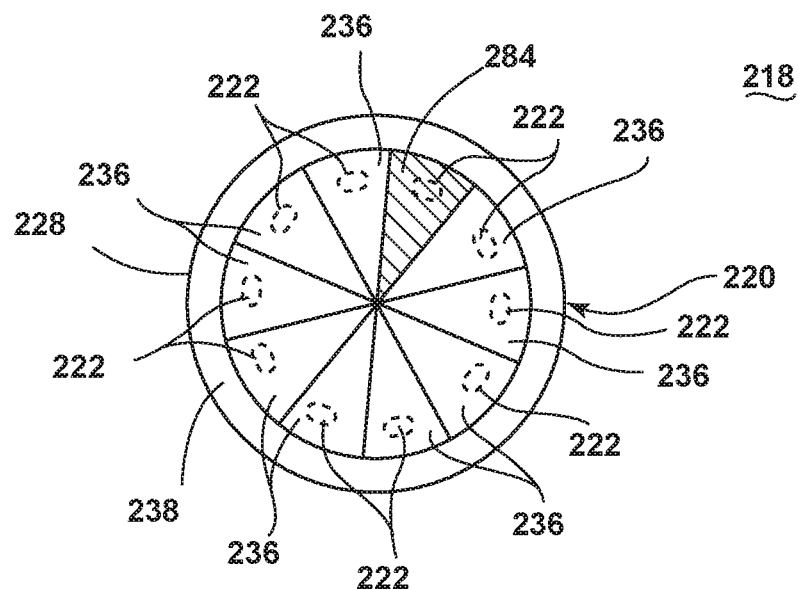
FIG. 3 is a top view of a knob of a third embodiment.

FIG. 3 illustrates a third embodiment of a knob assembly 218. The third embodiment is similar to the first and second embodiments, with the primary difference being the third embodiment has an outer surface 228 which is primarily made up of multiple, discrete indicia 236 with structural framework in the form of a hub 238. For the most part, like parts between the two embodiments will be identified with like numerals, with the numerals of the third embodiment having the 200 prefix. Each indicia 236 is of a pie-shaped design wherein each pie section is directly over one light source 222 for at least one rotational position. It is contemplated that the rotation of the knob assembly 18 is indexed such that the knob assembly 18 may be rotated through discrete rotational positions. In each of the positions, each of the pie sections will overlie a light source 222. To indicate which of the rotational positions is "selected" by the user based on the rotation of the knob assembly 18, the selected indicia 236 will be illuminated, either brighter or dimmer, than the other indicia 236, with it being brighter in most cases. To make the selected indicia brighter, the light source 222 underlying the indicia 236 may be increased in intensity and/or the other light sources may be decreased in intensity. The selected indicia 236 will result in a single, substantially brighter illuminated, area 284. This may function to visually display to the user which function the knob assembly 18 is selecting.

In the scenario of the third embodiment, knob assembly 218 is likely to be configured to have discrete stops or detents to provide tactile feedback to the user of their selection. The corresponding data table would include a list of rotational positions and the corresponding intensity levels for each of the light sources 122. The intensity levels would take into account and compensate for any structural framework, which would likely comprise walls extending radially outwardly from the center of the knob 220, along the sides of the pie-shape sectors, as well as take into account the additional intensity needed for area 284 to be substantially brighter.

Figure 4:
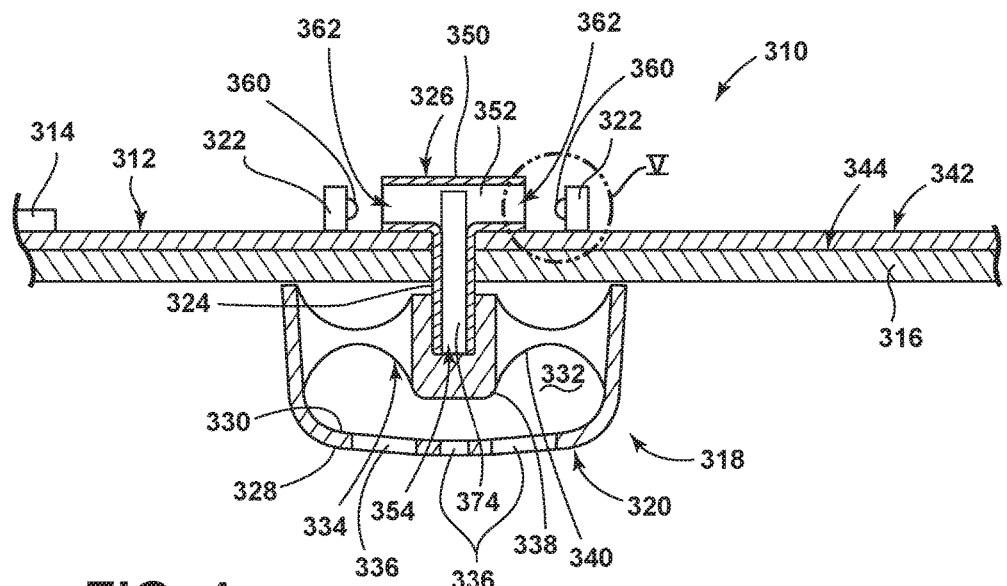
FIG. 4 is a side, cross-sectional view of a fourth embodiment of a knob assembly of the invention.

FIG. 4 illustrates a fourth embodiment of a knob assembly 318. For the most part, like parts between the embodiments will be identified with like numerals, with the numerals of the prior embodiments having the 300 prefix. A human user interface 310 is shown and includes a controller in the form of a PCB 312 with a microprocessor 314, and a fascia 316 overlying the PCB 312. The fourth embodiment is similar to the prior three embodiments, with the primary difference being the fourth embodiment has side-firing light sources 322, located on a rear side 342 of the PCB 312 with corresponding light guides 324, which emit light into an interior 332 of the encoder 326. The side-firing light sources 322 could just as easily be mounted to a front side 344 of the PCB 312. This side-firing configuration may be used with any of the embodiments.

In the fourth embodiment, the rotatable knob 320 comprises an outer surface 328 and an inner surface 330 defining an interior 332 with a structural framework 334 located within the interior 332, and a light-transmissive indicia 336 provided on the knob 320 and viewable from the outer surface 328. Light sources 322 comprise a light emitter 360. Light sources 322 may be LEDs or alternate light emitting devices.

The rotary encoder 326 comprises a body 350 defining an interior 352, and a rotatable shaft 354 supported by the body 350. A light guide 374 may be provided within the shaft 354 or integrally formed with the shaft 354. The rotatable knob 320 is fixedly mounted to the rotatable shaft 354 to effect rotation of the knob 320. The body 350 comprises at least one window 362 corresponding to the at least one light sources 322 through which light emitted from the light sources 322 is transmitted to the interior 352. The body 350 may comprises a peripheral side wall and the windows 362 may be spaced about the peripheral sidewall. The light sources 322 correspond to windows 362 and optically couple the body interior 332 to the knob interior 332. Wherein the light emitted exteriorly of the body 350 from one of the light sources 322 passes through the corresponding window 362 and is transmitted by the corresponding light guide 374 from the body interior 352 to the knob interior 332.

Figure 5:
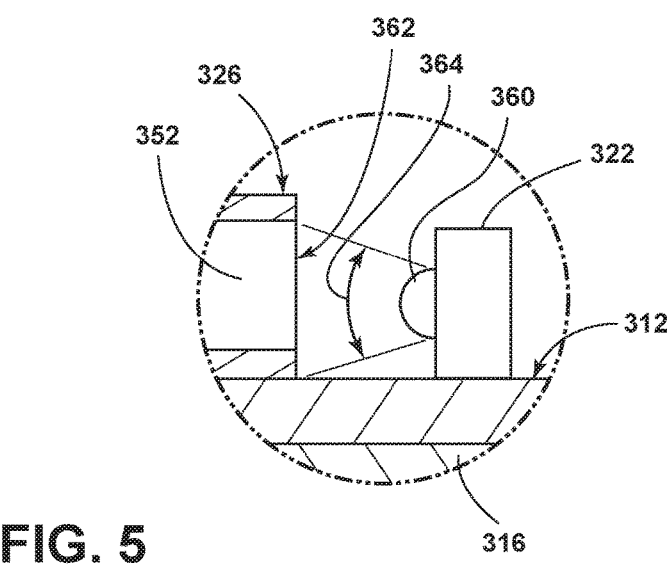
FIG. 5 is an enlarged view of FIG. 4 of a light source of the fourth embodiment.

FIG. 5 illustrates an enlarged view of the light source 322 and encoder body 350 to illustrate the relationship between the light emitted from the light source 322 and the windows 362. The light source 322 emits a light having a beam angle 364. The at least one light source 322 and at least one window 362 are relatively positioned such that an arc segment defined by the beam angle 364 passes through the at least one window 362, which ensures that the greatest amount of light is provided to the interior 332 of the encoder 326. The beam angle 364 is the degree of width that light emits from a light source 322. In specific terms this is the angle between the opposing points on the beam axis where the intensity drops to 50% of its maximum. The beam angle 364 may be larger than the window 362 if the light source 322 is not immediately outside of the window 362. In alternate embodiments, the light source 322 may be closer to or enclosed by the encoder body 350 and light emitter 360 may be located within the window 362 in order to reduce light bleeding away from the encoder 326.

While the window 362 is illustrated as an opening in the encoder body 326, the window 362 may be a transmissive portion in the encoder body. As a transmissive portion, it may be either translucent or transparent. The transmissive portion may also be colored to alter the color of the emitted light. It is further contemplated that the window 362 may essentially be an opening in the body 326 in which a window "pane" is provided, with the pane providing the transmissive portion, for example.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A knob assembly, comprising:
a repositionable knob having an outer surface and an inner surface defining an interior, a structural framework located within the interior, and a light-transmissive indicia provided on the repositionable and viewable from the outer surface;
at least one light source located relative to the repositionable knob and emitting light to transmit light into the interior of the repositionable knob past the structural framework and backlight the light-transmissive indicia;
a position sensor providing a position output indicative of a position of the repositionable knob; and
a controller receiving the position output and operably coupled to the at least one light source to independently control an intensity of light transmitted by the at least one light source, the controller programmed to use the position output to control the intensity of the at least one light source to at least partially compensate for any blocked light to maintain a predetermined backlighting of the light-transmissive indicia.

2. The knob assembly of claim 1 wherein the predetermined backlighting comprises a generally even backlighting across the light-transmissive indicia for intended movements of the repositionable knob.

3. The knob assembly of claim 1 wherein the light-transmissive indicia comprises an insert provided in the repositionable knob.

4. The knob assembly of claim 1 wherein the at least one light source comprises a light guide.

5. The knob assembly of claim 1 wherein the at least one light source comprises multiple light sources.

6. The knob assembly of claim 1 wherein the repositionable knob comprises a rotatable knob.

7. The knob assembly of claim 1 wherein the light-transmissive indicia comprises multiple light transmissive indicia.

8. The knob assembly of claim 7 wherein the predetermined backlighting highlights one of the multiple light transmissive indicia.

9. The knob assembly of claim 8 wherein the predetermined backlighting substantially illuminates the other of the multiple light transmissive indicia.

10. The knob assembly of claim 1 further comprising a printed circuit board (PCB) to which the repositionable knob and the at least one light source are mounted.

11. The knob assembly of claim 10 wherein the PCB has a front side confronting the repositionable knob and a rear side opposite the front side, and the at least one light source is mounted to one of the front or rear sides.

12. The knob assembly of claim 11 wherein the at least one light source comprises a light emitter and a light guide directing emitted light from the light emitter to the interior of the repositionable knob.

13. The knob assembly of claim 12 wherein the at least one light source is located on the rear side of the PCB and the light guide directs the light from the rear side to the interior of the repositionable knob.

14. The knob assembly of claim 13 wherein the repositionable knob further comprises a rotatable shaft having one end fixedly mounted to the structural framework and another end rotatably mounted to the PCB.

15. The knob assembly of claim 14 wherein the at least one light source comprises multiple light sources positioned around the rotatable shaft.

16. The knob assembly of claim 15 wherein the position sensor comprises a rotary encoder having a body defining an interior, a rotatable shaft rotatably supported by the body, wherein the repositionable knob is fixedly mounted to the rotatable shaft to effect repositioning of the repositionable knob by rotation of the rotatable shaft.

17. The knob assembly of claim 16 wherein the body comprises multiple windows corresponding to at least one of the multiple light sources through which light emitted from the at least one of the multiple light sources is transmitted to the interior, and multiple light guides corresponding to the multiple windows and optically coupling the body interior to the repositionable knob interior, wherein light emitted from the at least one of the multiple light sources passes through the corresponding window and is transmitted by the corresponding light guide from the body interior to the repositionable knob interior.

18. The knob assembly of claim 17 wherein the windows and corresponding multiple light sources are spaced around the body.

19. A knob assembly, comprising:
a repositionable knob having an outer surface and an inner surface defining an interior and a light-transmissive indicia provided on the repositionable knob and viewable from the outer surface;
at least one light source located relative to the repositionable knob and emitting light to transmit light into the interior of the repositionable knob and backlight the light-transmissive indicia;
a position sensor providing a position output indicative of a position of the repositionable knob; and
a controller receiving the position output and operably coupled to the at least one light source to independently control an intensity of light transmitted by the at least one light source, the controller programmed to use the position output to control the intensity of the at least one light source to maintain a predetermined backlighting of the light-transmissive indicia.

20. A knob assembly, comprising:
a repositionable knob having an outer surface and an inner surface defining an interior, a structural framework located within the interior, and a light-transmissive indicia provided on the repositionable knob and viewable from the outer surface;
at least one light source located relative to the repositionable knob and emitting light into the interior of the repositionable knob past the structural framework and backlight the light-transmissive indicia;
a position sensor providing a position output indicative of a position of the repositionable knob; and
a controller receiving the position output and operably coupled to the at least one light source to independently control an intensity of light transmitted by the at least one light source based on the received position output to maintain a predetermined backlighting of the light-transmissive indicia.

* * * * *